Feb. 21, 1939.  A. H. WOODWARD  2,147,941
TIMING MECHANISM
Filed March 18, 1935  6 Sheets—Sheet 2

Inventor:
Arthur H. Woodward.
By Brown, Jackson, Boettcher & Dienner.
Attys.

Feb. 21, 1939.  A. H. WOODWARD  2,147,941
TIMING MECHANISM
Filed March 18, 1935.  6 Sheets-Sheet 3

Feb. 21, 1939.  A. H. WOODWARD  2,147,941
TIMING MECHANISM
Filed March 18, 1935   6 Sheets-Sheet 5

Fig. 12.

Inventor:
Arthur H. Woodward.
By Brown, Jackson, Boettcher & Dienner,
Attys

Feb. 21, 1939.  A. H. WOODWARD  2,147,941
TIMING MECHANISM
Filed March 18, 1935     6 Sheets-Sheet 6

Inventor:
Arthur H. Woodward
By Brown, Jackson, Boettcher & Dienner,
Attys.

Patented Feb. 21, 1939

2,147,941

UNITED STATES PATENT OFFICE 2,147,941

TIMING MECHANISM

Arthur H. Woodward, Winnetka, Ill., assignor to International Register Company, Chicago, Ill., a corporation of Illinois Application March 18, 1935, Serial No. 11,529

20 Claims. (Cl. 200—33)

This invention relates to coin controlled means, and has to do with a meter particularly suitable for use with a mechanism which is sold on the time payment plan, the agreed upon payments being effected by insertion of coins of proper value into the meter.

The meter of my invention is particularly suitable for use with electric refrigerators, though it may be used to advantage with various mechanisms. One of the objects of my invention is to provide a coin operated meter of comparatively simple and compact construction which is highly efficient and may be produced at relatively low cost. A further object is to provide a meter having means for preventing use of the controlled mechanism, in the event such mechanism has remained out of use for an appreciable time, until all of the agreed payments for such mechanism as to which the purchaser may be in arrears have been paid in full by insertion of coins into the meter. It is also an object of my invention to provide means for indicating the number of payments made at any one time and the remaining time for which the controlled mechanism will operate without the insertion of additional coins, and means for indicating the number of payments as to which the purchaser may be in arrears. Another object is the provision of appropriate means for warning the purchaser of the approach of the end of the time for which payment has been made, the disabling of the controlled mechanism, and a predetermined number of payments as to which the purchaser is in arrears. Further objects and advantages will appear from the detail description.

The meter of my invention is, in general, similar in construction and operation to the meter disclosed in the copending application of Ernest H. Thompson, filed March 21, 1935, Serial No. 12,166, but embodies certain improvements thereover, above referred to and which will be hereinafter set forth in detail.

Figure 9:
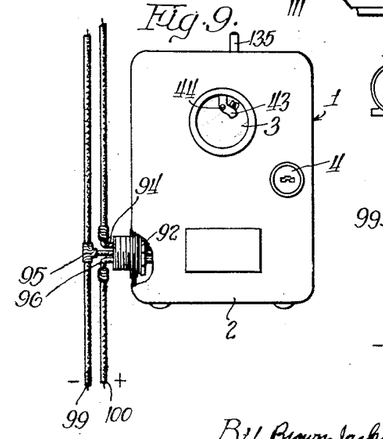
Figure 9 is a front view of the meter as applied to a conduit, parts being broken away and shown in section.

In the drawings, with the exception of Figure 9, the meter is illustrated as approximately one and one-half times its actual size, for clearness of illustration. The mechanism of the meter is disposed within a suitable casing 1, the front of which is normally closed by a hingedly mounted door 2 provided with a window 3 (Figure 9) for observation of the dial of the meter mechanism, as will be explained. The door is further provided with a key operated cylinder lock 4 of known type having an element disposed to engage in back of the forward arm 5a of a U-shaped bracket 5 spot-welded or otherwise suitably secured to one side wall of the casing. Inner arm 5b of bracket 5 projects inwardly of casing 1 beyond arm 5a, and brackets 6 are secured to the inner face of the other side wall and the top wall of the casing. A supporting plate 7 fits within casing 1 and seats upon brackets 6 and arm 5b of bracket 5, this plate being secured to the brackets by screws 8, or in any other suitable manner. The lower portion of plate 7 is cut away to accommodate a plate 9 of approximately L-shape in front view, this plate 9 defining, with the adjacent portions of the bottom and side walls of the casing, a coin receptacle which receives the coins inserted into the meter, as will be later described.

Figure 12:
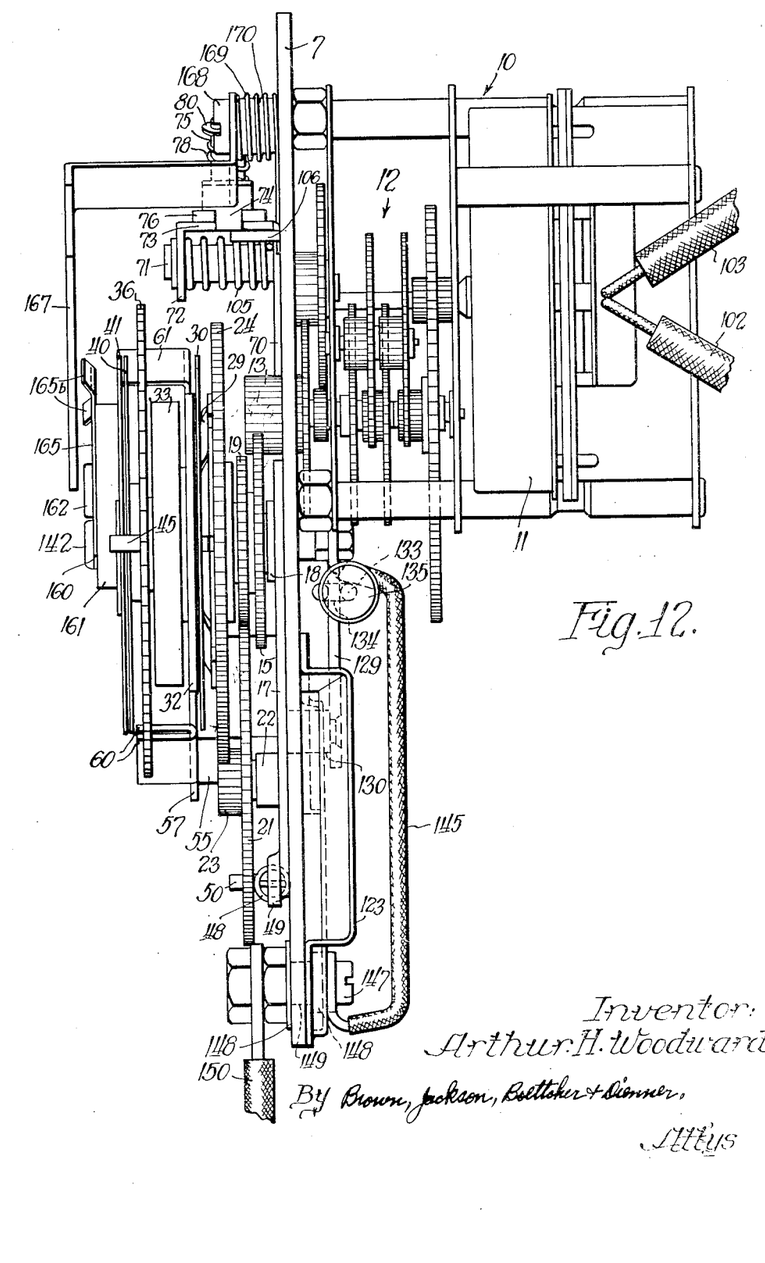
Figure 12 is a plan view of the meter of Figure 11 removed from its casing.

A clockwork assembly 10 (Figure 12) is suitably mounted on plate 7 at the back thereof. This assembly comprises a self-starting synchronous motor 11 of known type, which, through a gear train 12, drives a pinion 13 (Figure 2) at constant speed. This pinion projects through an opening 14 in plate 7, and the front of the pinion is flush with the front face of a gear 15 with which the pinion meshes. Gear 15 is rotatably mounted on a stub shaft 16 secured in plate 7, and is disposed in front of a switch control lever 17 mounted for free turning movement on the stub shaft and confined between plate 7 and a slotted lock member 18 of known type which engages into a circumferential groove in the stub shaft. A gear 19 is secured to hub 20 of gear 15, in front of and spaced from the latter gear. Gear 19 meshes with a gear 21 (Fig. 2) rotatably mounted on a pin 22 carried by lever 17 and disposed remote from stub shaft 16. A pinion 23, secured to gear 21 at the front face thereof, meshes with a relatively large gear 24 (Figures 1 and 3), rotatably mounted on stub shaft 16 in front of hub 20 of gears 15 and 19. Gear 21 and pinion 23 are driven in a counterclockwise direction, pinion 23 normally driving gear 24 in a clockwise direction, as viewed in Figure 1.

Gear 24 is provided with a central opening into which tightly fits a disc 25 of suitable friction material which fits snugly about lower flattened portion 26a of a bearing sleeve 26 rotatably mounted on stub shaft 16. The gear 24 is confined between a washer 27 secured on the inner end of sleeve 26 and a disc 28 fitting snugly about portion 26a of the sleeve. A spring clutch disc 29 fits snugly about portion 26a of sleeve 26 and is confined under pressure between disc 28 and an outer disc 30 which fits snugly about flattened portion 26a of sleeve 26 in contact with shoulders 26b of the latter. There is thus provided friction driving connections between gear 24 and sleeve 26 and disc 30 effective for rotating these parts as a unit in the normal rotation of the gear, but permitting independent rotation of gear 24 when sleeve 26 and disc 30 are held against rotation.

Figure 3:
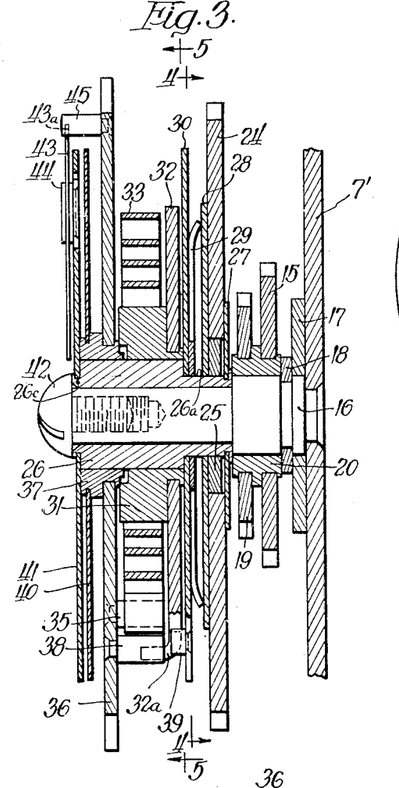
Figure 3 is a sectional view through the meter taken substantially on line 3—3 of Figure 1, parts being shown in elevation, with the elements of the setting and controlling assembly in their initial relative positions.
Figure 4:
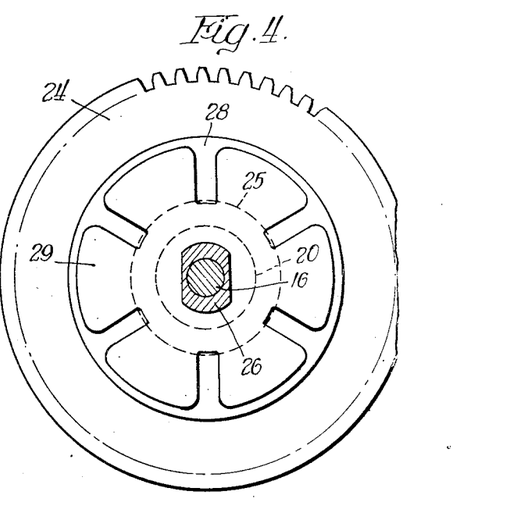
Figure 4 is a sectional view of the meter taken substantially on line 4—4 of Figure 3.

A hub 31 is rotatably mounted on the outer portion of sleeve 26 and carries at its inner end a control disc 32 suitably secured thereto. A spiral spring 33 has its inner end anchored to hub 31, at 34, and its outer end secured about a pin 35 secured in, and projecting from the inner face of, a toothed wheel 36 secured to a hub 37 rotatably mounted on sleeve 26 in advance of hub 31. Disc 32 is provided with a forwardly projecting finger 32a which normally contacts the leading face of a second pin 38 secured in wheel 36 adjacent pin 35, this finger being also disposed in advance and in the path of travel of a pin 39 secured in disc 30 and projecting forwardly therefrom. The gear 24, control disc 32, wheel 36, and associated parts, constitute a setting and controlling assembly, and when the parts of this assembly are in their initial relative positions, that is, in the positions of zero relative rotation, finger 32a is in contact with the leading face of pin 38 and the leading face of pin 39 is in contact with finger 32a, as shown in Figure 3, at which time the controlled mechanism is disabled, as will be hereinafter explained.

With the parts of the setting and controlling assembly in their initial relative positions shown in Figure 3, wheel 36 may be turned clockwise, as viewed in Figure 1, through a complete rotation, relative to gear 24, by insertion of the proper number of coins, as will be explained later. When wheel 36 has thus been turned through a complete rotation, carrying with it the disc 32 and spring 33, the leading face of finger 32a contacts the following face of pin 39, pin 38 remaining in contact with the following face of finger 32a. That prevents further rotation of wheel 36 clockwise, relative to gear 24, as will be explained later. With wheel 36 remaining in its latter position, gear 24 may turn through one complete rotation clockwise, relative to wheel 36 and disc 32, since pin 39 is now disposed in advance of finger 32a. Upon completion of this one rotation of gear 24, pin 39 is disposed in contact with the following face of finger 32a, as in Figure 3. Thereafter, with wheel 36 held against rotation, gear 24 may be turned clockwise through a second complete rotation, carrying with it the disc 32, this second rotation of gear 24 being permitted by the spring 33, which is thus placed under tension. Upon completion of the second rotation of gear 24, the leading face of finger 32a contacts pin 38, and the leading face of pin 39 contacts finger 32a, thus preventing further rotation of gear 24 clockwise, so long as wheel 36 is held in its initial position. It will be seen that gear 24 is thus capable of turning through substantially two complete rotations relative to wheel 36. That is of importance as rendering possible advance payments sufficient to permit use, for a considerable length of time, of the device or mechanism controlled by the meter, while also rendering it possible to collect a considerable number of payments on such device or mechanism, as to which the purchaser or user theerof may be in arrears; as will be explained more fully hereinafter.

A dial disc 40 is secured on the outer end of hub 37 in rear of and adjacent an opaque disc 41 suitably secured on the outer squared end 26c of sleeve 26. Disc 40 is provided with two concentric scales 40a and 40b, the former indicating the extent of rotation of wheel 36 in accordance with the number of coins inserted, and the latter indicating the extent of rotation of gear 24 relative to wheel 36 after the controlled mechanism has been disabled, and the number of coins which must be inserted before said mechanism can again be operated. The assembly is retained in position upon stub shaft 16 by a screw 42 threaded therein. By removing screw 42 the assembly may be removed and replaced as a unit to permit of removal and replacement of the timing gears 15 and 19 and 21 and 23 for varying the timing of the mechanism, as explained in detail in the application of Ernest H. Thompson, above referred to.

Disc 41 is provided with two openings 41a and 41b aligned with scales 40a and 40b respectively of disc 40, each of a size to display a number of one of the scales corresponding to the relative rotary positions of ratchet wheel 36 and gear 24. A shutter 43 is pivoted at 44 on the front of disc 41 and is positionable to cover either one of the openings in this disc, being frictionally held in adjustment. The outer end of this shutter is notched to provide two projections 43a and 43b which, when wheel 36 and gear 24 are in their initial positions of zero relative rotation, shown in Figure 11, receive between them a pin 45 secured in and projecting forwardly from the wheel. If wheel 36 is now rotated clockwise, by insertion of one or more coins, pin 45 clears projection 43b and shutter 43 remains in its normal position over opening 41b of disc 41, the extent of rotation of the wheel and the number of coins inserted being indicated by the number of scale 40a displayed through opening 41a, as in Figure 1. But if no coins are inserted when gear 24 reaches the zero position of Figure 11, disc 41 continues to rotate clockwise with gear 24, shutter 43 is turned counterclockwise into position to cover opening 41a of disc 41, by contact of projection 43a with pin 45, and thereafter the extent of overrunning of wheel 36 by gear 24, and the number of coins required to be inserted in order to return the parts to zero position, is indicated by the number of scale 40b displayed through opening 41b.

Lever 17 is provided, adjacent its free end, with a tongue 46, struck rearwardly therefrom and projecting into an opening 47 in plate 7, this tongue cooperating with the bottom edge of opening 46 for limiting turning movement of the lever 17 in clockwise direction on stub shaft 16. Normally, the lever 17 is held in its extreme position in clockwise direction about the stub shaft, by a tension spring 48, the upper end of which is hooked through a tab 49 extending downward from the outer end of lever 17, the lower end of this spring being hooked through a tab 50 struck from plate 7 and projecting forwardly thereof. Lever 17 is further provided with an arm 51 extending therefrom at an inclination downward and away from the outer end of the lever, the lower end of this arm being shaped to provide an upwardly projecting latch element 52. Arm 51 is provided, at its lower edge, with a forwardly offset element 53 which forms with plate 7 a pocket for reception of an element of a setting pawl, hereinafter referred to.

Figure 1:
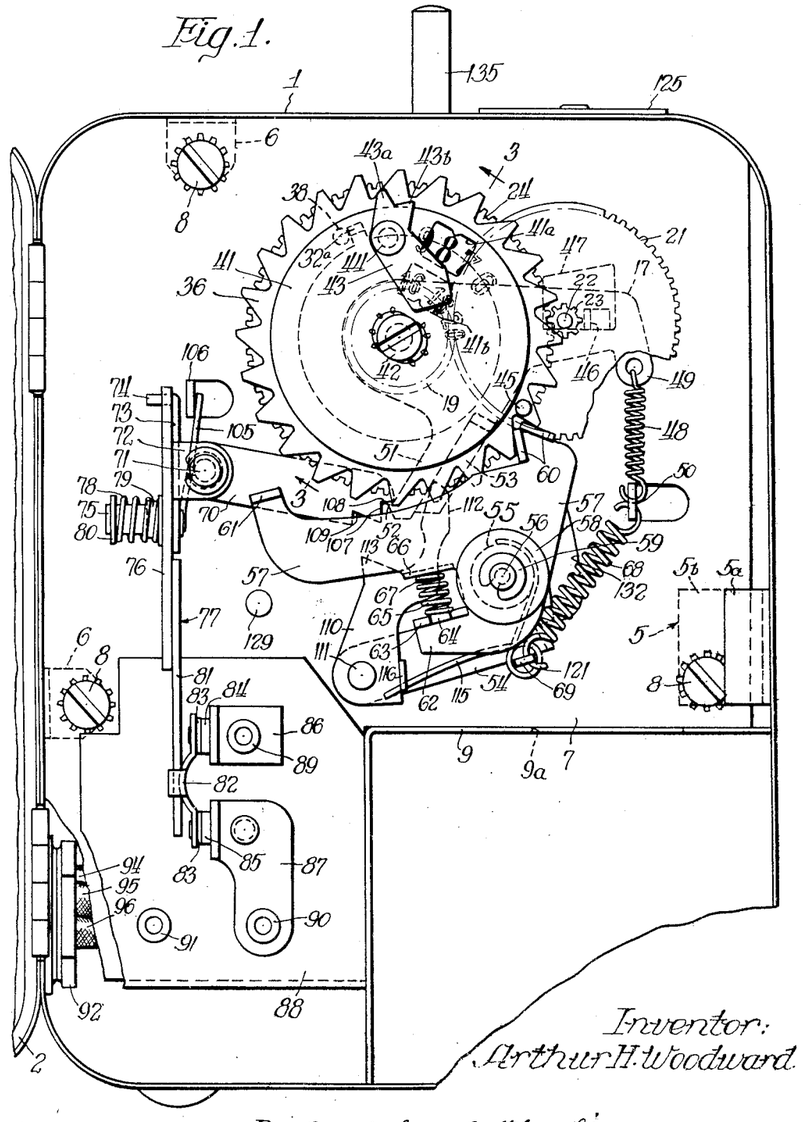
Figure 1 is a front view of a meter embodying my invention mounted in a suitable casing, the door of the casing being in open position.
Figure 2:
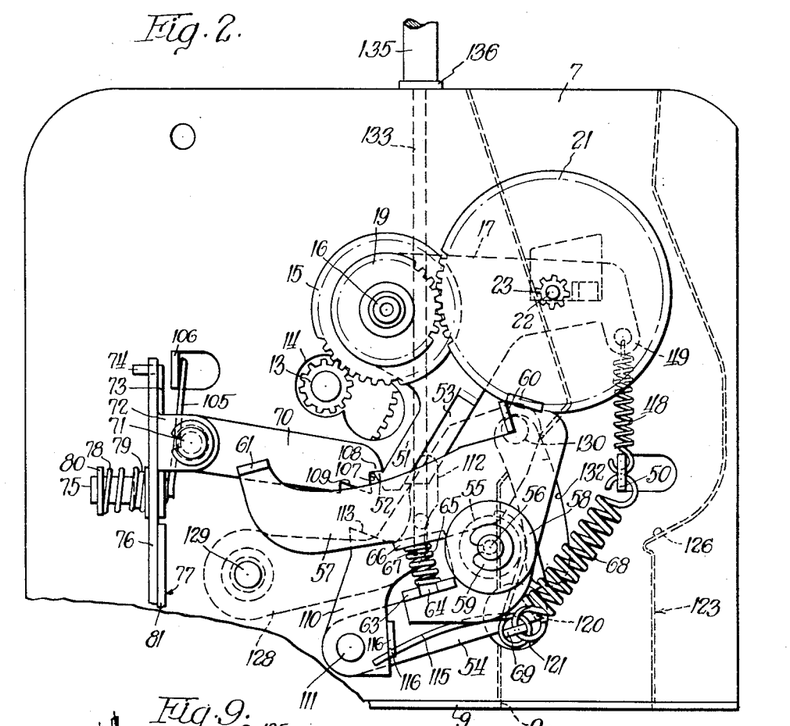
Figure 2 is a plan view of the meter removed from the casing, partly broken away and with the setting and controlling assembly removed.

A setting lever 54, shaped as shown in Figures 1 and 2, is secured upon the reduced rearward end of a sleeve 55, mounted for turning movement on a post 56 secured in plate 7 below arm 51 of lever 17. A timer setting pawl 57 is mounted for turning movement on post 56 and is confined between the forward end of sleeve 55 and a washer 58 confined between pawl 57 and a lock member 59 of known type engaging into a circumferential groove in the post. Setting pawl 57 is provided, at the end thereof adjacent gear 21, with two tabs 60 which project forward from the pawl and converge toward wheel 36, these tabs defining a tooth element adapted for engagement between the teeth of the wheel. Pawl 57 is further provided, at its other end, with a forwardly projecting tab 61 disposed to contact the following edges of the teeth of wheel 36, and cooperating with the tooth defined by tabs 60 for imparting clockwise rotation to wheel 36 in the operation of setting the mechanism for a predetermined time period of operation. Pawl 57 is also provided, at its lower portion, with a stop finger 62 disposed to contact the lower face of a tab 63 projecting forwardly of lever 54 at the upper edge thereof. The central part of tab 63 is struck upwardly to provide a stud 64 which extends into the lower end of a compression coil spring 65, confined between tab 63 and a tab 66 projecting rearwardly from the timer setting pawl 57 at the lower edge thereof. The central portion of tab 66 is struck downward to provide a stud 67 which extends into the upper end portion of spring 65. A tension spring 68 is attached at its upper end to tab 50 of plate 7, and has its lower end hooked through a tab 69 projecting forwardly from lever 54 at the lower edge thereof. This tension spring normally holds lever 54 in such position that tab 63 thereof contacts the upper edge of finger 62 of the timer setting pawl 57, and retains the latter in such position that the tooth element defined by tabs 60 engages between two adjacent teeth of wheel 36 and locks the latter against rotation in either direction.

An arm 70 is pivotally mounted on a stud 71 secured in plate 7 and projecting forwardly therefrom, adjacent wheel 36 and at the opposite side thereof from stud 56. Stud 71 passes through arm 70 and through a tab 72 parallel with arm 70 and projecting from the forward edge of a base plate 73 integral with the outer end of the arm. A T-shaped finger 74 projects from the upper end of plate 73 oppositely to arm 70. A pin 75 is secured through the lower end of plate 73 and extends loosely through member 76 of a movable switch arm 77. Member 76 is conveniently formed of strip metal and has its upper end slotted and loosely inserted beneath the head of the T element 74 to permit of relative rocking movement between member 76 and element 74. A compression coil spring 78 is disposed about pin 75 and confined between a flanged collar 79 seating against the outer face of member 76 and an abutment member 80 of known type, in the form of a slotted locking member which engages into a circumferential groove in the pin. Arm 77 comprises a lower member 81, conveniently in the form of a strip of fiber, riveted or otherwise suitably secured to member 76. A bridging contact member 82 is suitably mounted on the lower end of member 81 for limited rocking movement on an axis extending transversely thereof. The contact member 82 carries two contact points 83 disposed for contact with points 84 and 85 of cooperating contact members 86 and 87, when the switch arm is in switch closing position. Members 86 and 87 are mounted on a supporting plate 88 of insulating material suitably secured to plate 7 and projecting downward therefrom. Binding posts 89 and 90 are suitably secured to the contact members 86 and 87, respectively, and project rearwardly from the supporting plate 88, and a third binding post 91 is secured to plate 88 and projects rearwardly therefrom.

Figure 10:
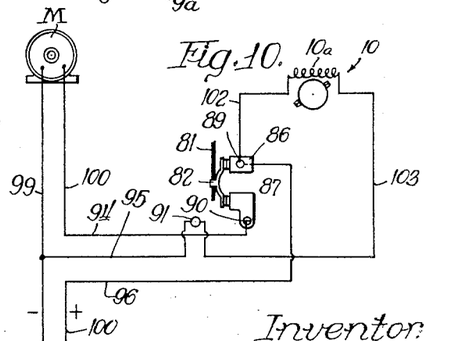
Figure 10 is a diagram of the electrical circuits of the meter motor and the motor of the controlled mechanism.

Referring to Figures 9 and 10, three lead wires 94, 95 and 96 extend through a nipple 92, appropriately secured through one side wall of casing 1, for connection to wires 99 and 100. The latter two wires are connected to the poles of a motor M of the controlled mechanism, such as an electric refrigerator, and to a suitable source of electrical energy. Wire 100 is cut to provide a gap therein and is connected, at one side of the gap, by lead 94 to binding post 90, and, at the other side of the gap, by lead 96 to binding post 89. Motor M is thus connected in series with the switch which is controlled by the meter. It will be apparent that the circuit of motor M is enabled or conditioned for operation when the switch is closed, and that the controlled mechanism is disabled and cannot operate when the switch is open. One pole of field coil 10a of the meter motor 10 is connected by a lead 102 to binding post 89, and through the latter to lead 96. The other pole of field coil 10a is connected by a lead 103, binding post 91, and lead 95 to wire 99. Motor 10 is thus connected in shunt with motor M and will continue to operate when the control switch is open, so that gear 24 of the meter is driven continuously and independently of the use of the controlled mechanism. This renders it possible to prevent closing of the control switch and use of the controlled mechanism until all agreed upon payments as to which the purchaser may be in arrears have been paid in full by insertion of the proper number of coins into the meter.

Figure 11:
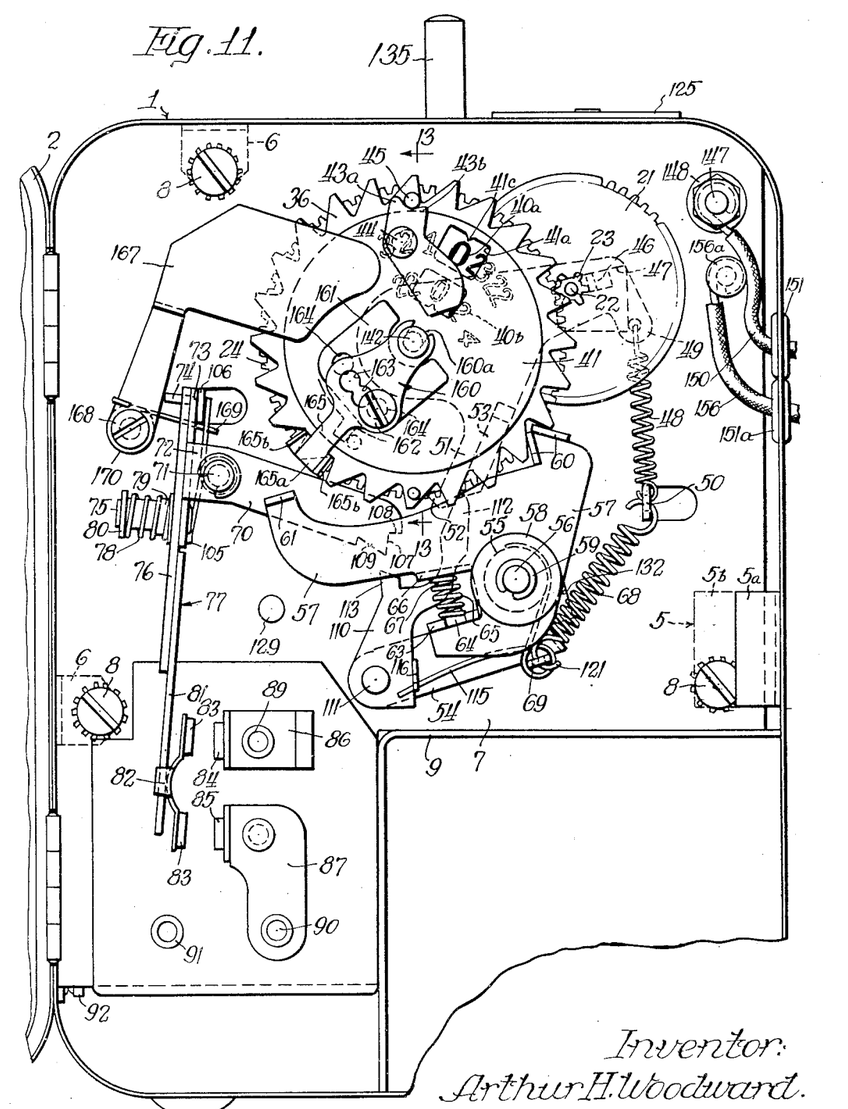
Figure 11 is a view similar to Figure 1 of a modified form of meter embodying my invention.

Switch arm 77 is yieldingly urged into switch opening position by a wire spring 105 coiled about stud 71, one arm of this spring bearing against the inner face of plate 73 adjacent the lower end thereof, and the other arm of this spring bearing against a tab 106 struck from plate 7 and projecting forwardly therefrom. Tab 106 also serves as a stop element for limiting the opening movement of arm 77, as shown in Figure 11.

Arm 70 is provided, at its inner end, with a notch 107 defining a latch element 108 adapted for cooperation with latch element 52 of arm 51 of lever 17, and is further provided, at its lower edge, with a notch forming an inclined edge 109. A switch settling pawl 110 is pivoted at its lower end, at 111, on the inner end of the setting lever 54. This pawl is provided, at its upper end, with a relatively long finger 112 and a short finger 113, the latter being disposed to contact edge 109 of arm 70 upon upward movement of pawl 110, when lever 17 is in its normal lowered position. Finger 112 extends into the pocket defined by element 53 of arm 51 and plate 7, and is yieldingly held in contact with the lower edge of arm 51 by a wire spring 115 disposed about tab 69, one arm of which spring contacts the lower edge of a tab 116 projecting forwardly from the outer edge of pawl 110, the other arm of spring 115 engaging about sleeve 55.

Setting lever 54 is provided, at its outer end, with a rearwardly extending tab 120 which projects through an opening 121 in plate 7 and into a coin chute 123 (Figure 2) secured to the back of plate 7, the tab 120 extending across the chute from front to back thereof so as to intercept a coin passing through the chute. Coin chute 123 is preferably flared at its upper end, as shown, and is disposed in register with a slot of a plate 125 suitably secured to the top wall of casing 1. The coin chute is of suitable size for reception of 25¢ pieces or quarters, and is provided, intermediate its ends, with an inwardly offset portion 126 disposed to direct a coin into contact with tab 120 upon which the coin rests edgewise, at which time the coin is disposed mainly above tab 120 and is confined between this tab and the remote side wall of chute 123. It will be understood, of course, that the statement to the effect that chute 123 is of a size for reception of a 25¢ piece is by way of example only. The meter of my invention is suitable for many uses, and the required payments may be made by coins of various sizes and denominations. Accordingly, the chute 123 and the meter mechanism will, in any given instance, be adapted for reception of and cooperation with the particular coin to be inserted in conformity with the agreed upon payments.

An operating lever 128 is pivoted at one end, at 129, on the back of supporting plate 7 (Figure 2). At its other end lever 128 is provided with a forwardly projecting pin 130 (Figure 12) which projects through an arcuate slot extending downward and across portion 126 of coin chute 123, this slot being aligned with a similar slot 132 in plate 7. An operating rod 133 is provided adjacent its lower end with a bend, forming an element 134 which is inserted through a corresponding opening in lever 128. The other end of rod 133 extends into an elongated button 135, slidable through the top wall of casing 1 and provided at its lower end with a flange 136 which cooperates with this wall for limiting upward movement of the rod. Lever 128 is urged in an upward direction about its pivot 129, as viewed in Figure 2, in a known manner, as by a wire spring, one arm of which engages the lower edge of the lever, and the other arm of which contacts an element of the supporting structure of the clockwork 10.

*Operation of the mechanism*

Figure 5:
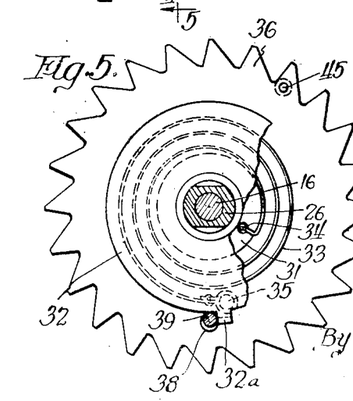
Figure 5 is a sectional view of the meter taken substantially on line 5—5 of Figure 3.
Figure 6:
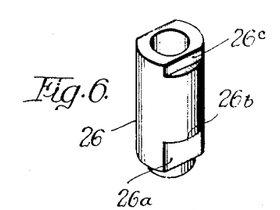
Figure 6 is a detail perspective view of the bearing member for the setting and controlling assembly.
Figures 7, 8:
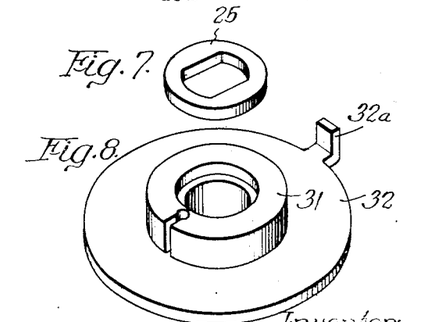
Figure 7 is a detail perspective view of the adapter between the gear and the bearing member of the setting and controlling assembly.
Figure 8 is a detail perspective view of the disc for establishing connection between the gear and the ratchet wheel of the setting and controlling assembly.

In Figure 11, pointer 41c of opening 41a is at the zero position on scale 40a, pin 39 of disc 30 is in contact with finger 32a of disc 32, as shown in Figures 3 and 5, and spring 33 offers resistance to rotation of gear 24 sufficient to cause lever 17 to be raised by the planetary action of pinion 23 travelling around gear 24. This releases arm 70 and permits movement of switch arm 77 into its open position by spring 105. When lever 17 is raised, pawl 110 is swung clockwise, as viewed in Figure 11, by means of arm 51 and finger 112 of pawl 110, so that finger 113 of the pawl will not contact edge 109 of arm 70 if pawl 110 is moved upward at this time. Accordingly, the switch can not be closed while lever 17 is retained in its raised position.

In order to close the control switch, a coin is inserted into the coin chute 123, after which the button 135 is depressed, thus swinging the operating lever 128 downward so as to bring pin 130 into contact with the coin and force the latter downward in the chute, from the lower end of which it passes through a slot 9a in member 9 into the coin receptacle. This downward movement of the coin swings the outer end of setting lever 54 downward with resulting upward movement of the inner end of this lever and turning movement of the setting pawl 57 in a clockwise direction as viewed in Figure 11, the movement of lever 54 being transmitted to pawl 57 through compression spring 65, as will be clear from Figures 1, 2 and 11. In this movement of pawl 57, finger 61 thereof is positioned in advance of one of the teeth of wheel 36 and the tooth defined by tabs 60 of this pawl is then disengaged from the wheel. This permits of turning of the setting and controlling assembly a short distance in a clockwise direction sufficient to return lever 17 to its normal lowered position, provided the purchaser is not in arrears as to the payments agreed upon. If the purchaser is in arrears, the lever 17 cannot be returned to lowered position until after insertion of coins corresponding in number to the payments due, as will be hereinafter explained more fully.

In the clockwise movement of pawl 57, finger 61 is brought into a position in advance of one of the teeth of wheel 36, and the tooth defined by tabs 60 of the pawl is disengaged from wheel 36, as above stated. Finger 61 contacts the following edge of the tooth of wheel 36 immediately in advance of this finger, in the continued clockwise movement of pawl 57, thus turning the setting and controlling assembly a short distance in a clockwise direction, after which further turning of pawl 57 in a clockwise direction is prevented by contact of the inner edge of finger 61 with the leading edge of that tooth of wheel 36 immediately in advance of which finger 61 is disposed. In the continued insertion of the coin, the outer end of setting lever 54 moves farther downward, and the inner end thereof continues to move upward, this being permitted by spring 65, which is compressed by this movement of the setting lever. Finger 113 of pawl 110 then contacts edge 108 of arm 70 so as to move this arm upward and, at about the same time, finger 61 of pawl 57 contacts the following edge of a tooth of wheel 36 so as to rotate the same a slight distance in clockwise direction. In the continued upward movement of pawl 110, arm 70 is raised, thus moving the switch arm 77 into switch closing position, and the inner end of arm 70 contacts the lower end of arm 51, swinging lever 17 a short distance in a counterclockwise direction against the tension of spring 48 until latch element 108 of arm 70 passes above latch element 52 of arm 51, at which time lever 17 is again returned to its lowermost position with a snap action by tension spring 48 so as to engage latch element 52 beneath latch element 108, thus locking the switch arm 77 in closed position. Arm 70 is moved upward a short distance by finger 113 of pawl 110, after switch arm 77 has been moved into closed position, this being permitted by the loose and resilient connections between arms 70 and 77, previously described, but downward movement of arm 70 is limited by element 52 of arm 51 so as to retain arm 77 in circuit closing position, as stated. This conditions the circuit of motor M for operation. If, now, additional coins be inserted, with resulting actuation of setting lever 54 for each coin inserted, arm 70 will be raised slightly by finger 113 of pawl 110, upon each actuation of lever 54, but the switch arm 77 will remain in circuit closing position, as above.

When the coin passes beyond tab 120 of lever 54, this lever is returned to its normal position by tension spring 68. In the return movement of the lever 54, the tabs 60 of pawl 57 engage between two adjacent teeth of wheel 36, advancing the wheel the remaining one-half of a space of the scale 40a, and then locking the wheel against rotation. In this manner, the wheel is advanced one full space of the scale upon insertion of a coin. Likewise, the wheel is advanced a corresponding distance for the insertion of each additional coin, it being noted that the scale 40a is provided with twenty-three spaces and the mechanism is intended for reception of twenty-three coins inserted one immediately after the other, starting at zero. When twenty-three coins have been inserted, wheel 36 has been turned through one complete rotation so that finger 32a is now disposed with its leading face in contact with pin 39, instead of having its following face in contact with pin 39 as in Figure 3, pin 38 remaining with its leading face in contact with the following face of finger 32a. Under these conditions, the setting and controlling assembly is locked against clockwise rotation by actuation of the setting pawl 57. However, the purchaser may continue to insert any desired number of coins, within the limits of the capacity of the coin receptacle, since compression spring 65 permits of operation of setting lever 54 independently of pawl 57, as will be obvious from the drawings and as above explained. This enables a purchaser, so desiring, to make advance payments on account in addition to the payments required to maintain the meter conditioned to permit operation of the controlled mechanism. Since compression spring 65 provides a yielding connection between pawl 57 and setting lever 54, it avoids subjecting pawl 57 to excessive stresses when the pawl is held against clockwise movement and the setting lever is operated, as will be obvious.

After closing of the control switch in the manner described, this switch will remain closed for a predetermined period of time, depending upon the number of coins inserted, this number being indicated by the exposed number of scale 40a. When the gear 24 again overtakes wheel 36 and reaches the zero position, the control switch will be opened, as above described.

If no coins are inserted when gear 24 overtakes wheel 36, and these two parts are in the zero position of Figure 11, gear 24 will continue to rotate in a clockwise direction and will overrun the wheel. Shutter 43 is then shifted to cover opening 41a of disc 41 and expose the numbers of scale 40b through opening 41b. The overrunning of wheel 36 by gear 24 places spring 33 under tension, due to contact of pin 39 with finger 32a of disc 32, and the reaction of this spring offers increasing resistance to rotation of gear 24 sufficient to assure that lever 17 will be held in raised position so long as the gear overruns the wheel. This assures that the control switch can not be closed until a sufficient number of coins have been inserted into the meter to pay in full for the time during which the controlled mechanism was not in use. The number of coins required to be inserted is indicated by the number of scale 40b exposed through opening 41b. When the proper number of coins have been inserted, wheel 36 overtakes gear 24, at which time shutter 43 is shifted by pin 45 to cover opening 41b, as shown in Figure 11. This returns the wheel 36 and gear 24 to zero position, and the control switch may now be closed by the insertion of an additional coin, the wheel being caused to overrun gear 24 a predetermined amount for each coin inserted, the number of coins inserted being indicated by the number of scale 40a exposed through opening 41a.

The numbers of the scales 40a and 40b may represent coins inserted and corresponding time periods, depending upon the ratio of the selected timing gears. In order to avoid possible confusion, it is desirable that the two scales be of different appearance. Conveniently, scale 40a consists of black figures on a white background and scale 40b consists of white figures on a red background. This difference in appearance of the two scales, while preferred, is not, however, essential.

The modified form of meter illustrated in Figures 11 to 14, inclusive, is the same as that of Figures 1 to 10, inclusive, except that I have provided signalling means for giving warning in advance of the end of the time period of operation of the controlled mechanism for which the meter has been set, and means for indicating that the switch is open.

Figure 13:
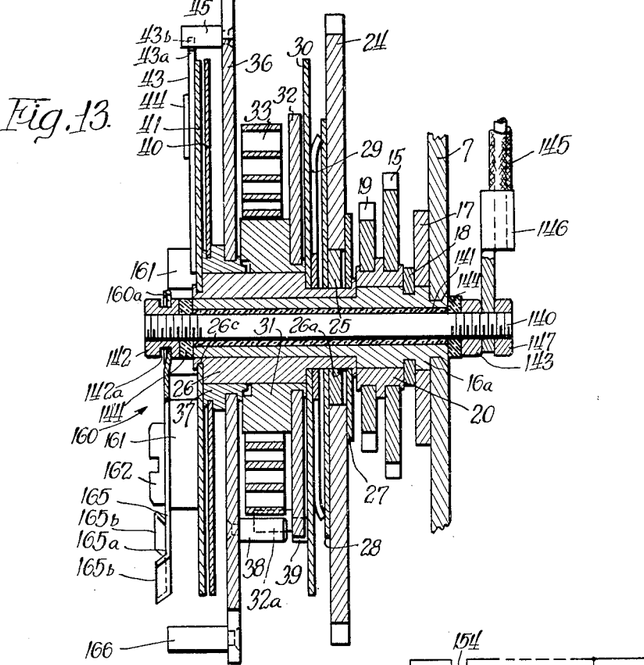
Figure 13 is a section taken substantially on line 13—13 of Figure 11.
Figure 14:
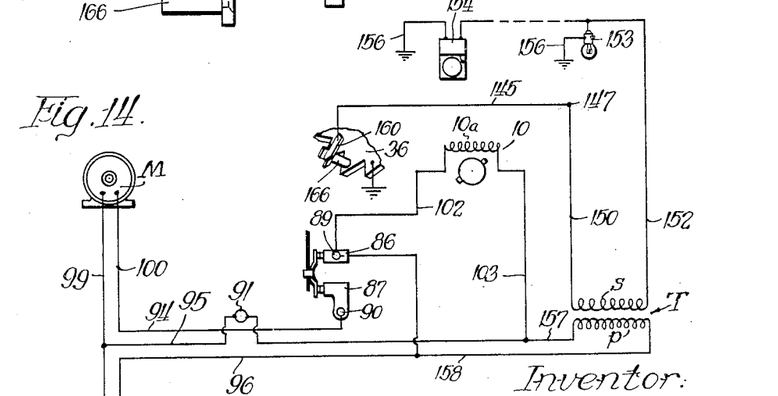
Figure 14 is a circuit diagram of the electrical connections of the meter of Figure 11 and the mechanism controlled thereby.

In Figure 13 stub shaft 16a is of tubular construction and receives a conducting rod 140 insulated therefrom by a sleeve 141 of suitable electrical insulating material. This rod is held against endwise movement by nuts 142 and 143 screwed onto the forward and rearward ends of the rod, respectively, and insulated from stub shaft 16a by insulating washers 144. A suitably insulated lead 145 is connected at one end to rod 140, by a terminal member 146 of known type fitting about rod 140 and clamped thereon between nut 143 and an outer nut 147 screwed onto the rearward end of the rod. The other end of lead 145 is connected to a binding screw 147 (Figure 12), secured through plate 7 and insulated therefrom by insulating washers 148 and an insulating bushing 149. A wire 150 passes through an insulating bushing 151 secured in one side wall of casing 1, and has its inner end attached to screw 147, the outer end of this wire being connected to one end of the secondary winding s of a suitable transformer T. The other end of winding s is connected, by a wire 152 to one pole of a suitably located signal device, such as light 153 or electric bell 154, the other pole of the signal device being grounded to plate 7 by a wire 156 passing through a bushing 151a adjacent bushing 151, and attached to plate 7 by a screw 156a. Primary winding p of transformer T has its ends connected by leads 157 and 158 to leads 95 and 96. Obviously, the signal device employed may be of any suitable or preferred type, and the transformer T may be replaced by any other suitable source of electrical energy, such as a dry battery.

A resilient metal contact arm 160 is adjustably secured to an insulating block 161, mounted on the front face of disc 41, by means of a screw 162 insertable through spaced openings 163 in the body of arm 160 and threading into either one of two spaced openings 164 in block 161. The inner end of arm 160 is slotted at 160a and deformed, so as to fit into a circumferential groove 152a in nut 142 and maintain rubbing contact with this nut at the front and the back of the groove. A finger 165 projects from arm 160 over ratchet wheel 36 and is provided at its outer end with a head 165a, the lateral portions 165b of which are bent forwardly as in Figure 13. Head 165 is disposed to contact with a metal pin 166 secured in wheel 36 and projecting forwardly thereof, in the clockwise rotation of the gear 24 relative to the wheel, thus grounding lead 145 to plate 7. This closes the circuit of the signal device and gives warning of the approach of the end of the time period for which the meter was set, and at the end of which the control switch will be opened unless additional coins are inserted. By inserting a suitable number of coins, the wheel 36 is advanced and moves pin 166 out of contact with head 165a of finger 165, opening the circuit of the signal device and stopping operation thereof. The contact arm 160 has a wide range of adjustment and may be set to give warning at any desired time in advance of the end of the time period for which the meter has been set, within limits.

In order to give notice when the control switch is open, I provided a flag 167 pivoted on a stud screw 168 secured in plate 7 adjacent the upper end of switch arm 77. This flag is urged in a clockwise direction, as viewed in Figure 11, by a wire spring 169 coiled about a sleeve 170 secured to the staff of the flag and rotatable on stud screw 168, one end of this spring engaging over the flag staff and the other end contacting the lower edge of tab 106. When the control switch is open, the flag overlies disc 41, as shown in Figure 11, and is visible through window 3 of casing 1. The flag is so disposed that the shank or staff thereof contacts head 74 of plate 73, and upon closing of the control switch the flag is turned counterclockwise so as to be disposed outward beyond the periphery of disc 41, in which position it is not visible through window 3.

In both forms of my meter illustrated, finger 32a of disc 32 remains in contact with pin 38 of wheel 36, the latter and disc 32 rotating as a unit when the wheel is rotated clockwise, so long as gear 24 does not overrun the wheel. In this latter event, disc 32 rotates with the gear as above described. If the gear 24 should at any time overrun the wheel 136 to such an extent as to turn through one complete rotation relative thereto, finger 32a of disc 32 will contact the following face of pin 38. Under such conditions, disc 32 would be held against rotation with the gear, but gear 24 would continue to rotate due to the slippage provided by the friction drive between this gear and bearing sleeve 23 and disc 30. This is an exceptional condition, however, not contemplated in the proper use of the meter, but the friction drive is of particular advantage in preventing breakage or other damage to the meter even under such an abnormal condition due to carelessness of the purchaser.

It will be apparent to those skilled in the art that changes in construction and arrangement of parts of my invention may be resorted to without departing from the field and scope of the same, and I intend to include all such variations, as fall within the scope of the appended claims, in this application in which the preferred forms only of my invention are disclosed.

What I claim is:

1. In combination, intermittently operable actuating means, a switch, a member continuously driven in one direction, a wheel rotatable in said direction, said member having a pin projecting toward said wheel and said wheel having a pin projecting toward said member in advance of the first pin, means normally holding said wheel against rotation but acting to rotate it a predetermined distance in said direction responsive to a single operation of said actuating means, a disc normally impositively driven by but otherwise free from said member and provided with a finger normally in contact with the leading face of the wheel pin and in advance and in the path of travel of the pin of said member, a spring connecting said wheel and said disc and placed under tension by rotation of the disc relative to the wheel and with said member, means coacting with said member for opening the switch when the pin of said member contacts said finger and maintaining it open while said member overruns said wheel, and means responsive to operation of said actuating means for closing said switch after said wheel overtakes said member.

2. In combination, intermittently operable actuating means, a control switch, controlling means therefor comprising two members rotatable in the same direction initially occupying a predetermined rotary position one relative to the other, one of said members being rotatable from said initial relative position through substantially two complete rotations relative to the other member and being rotated through a plurality of successive and equal distances each corresponding to a predetermined and equal time period, said other member being normally held against rotation but rotated a predetermined distance responsive to a single actuation of said actuating means, means for opening the switch when said one member overtakes said other member, said one member continuing to rotate through a plurality of said time period distances and overrunning said other member after opening of the switch, means preventing closing of the switch until said actuating means has been successively operated a plurality of times in sufficient number to cause said other member to overtake said one member, and means responsive to operation of said actuating means effective for closing said switch after said other member has overtaken said one member.

3. In combination, intermittently operable actuating means, a control switch, controlling means therefor comprising two members rotatable in the same direction initially occupying a predetermined rotary position one relative to the other, one of said members being continuously rotated at constant speed and rotatable from said relative initial position through substantially two complete rotations relative to the other member, the latter normally being held against rotation but rotated a predetermined distance responsive to a single operation of said actuating means, means effective for opening the switch when said one member has been rotated to a predetermined extent relative to said other member, said one member continuing to rotate and overrunning said other member for a predetermined distance after opening of said switch, means acting to prevent closing of the switch while said members are out of said relative initial position with said one member overrunning said other member, and means responsive to operation of said actuating means effective for closing said switch after said members are in said relative initial position.

4. In combination, intermittently operable actuating means, a control switch, two members rotatable in the same direction initially occupying a predetermined rotary position one relative to the other, one of said members normally being rotated and the other member normally being held against rotation but rotated a predetermined distance responsive to a single operation of said actuating means, means for opening the switch when said one member overtakes said other member, said one member continuing to rotate for a predetermined distance equal to a multiple of the distance through which said other member is rotated responsive to a single operation of said actuating means, after opening of said switch, means acting to prevent closing of the switch while said members are out of said relative initial position, and means responsive to operation of said actuating means effective for closing said switch after said members are in said relative initial position.

5. In combination, intermittently operable actuating means, a control switch, a first member continuously rotated in one direction, a second member normally held against rotation but rotatable a predetermined distance in said direction responsive to a single operation of said actuating means, means effective for opening said switch when said first member overtakes said second member, said first member being capable of continued rotation and overrunning of said second member for a predetermined distance equal to a multiple of the distance through which said second member is rotated responsive to a single operation of said actuating means, subsequent to opening of said switch, means acting to prevent closing of the switch until said second member overtakes said first member, and means responsive to operation of said actuating means effective for closing said switch.

6. In combination, intermittently operable actuating means, a control switch, controlling means therefor comprising two members rotatable in the same direction, one of said members being continuously rotated at constant speed, means normally holding the other member against rotation actuated by a single operation of said actuating means for rotating said other member a predetermined distance, means effective for opening said switch when said one member overtakes said other member, said one member being capable of continued rotation through substantially one complete rotation and overrunning of said other member after opening of said switch, and means for indicating the extent of rotation of said other member and for indicating the extent of overrunning of said one member.

7. In combination, intermittently operable actuating means, a control switch, controlling means therefor comprising two members rotatable in the same direction, one of said members being continuously rotated and the other of said members normally being held against rotation but rotated a predetermined distance responsive to a single operation of said actuating means, means for opening said switch when said one member overtakes said other member, said one member being rotatable through substantially two complete rotations and capable of substantially one complete rotation and overrunning of said other member after opening of the switch, means for indicating the extent of rotation of said other member and for indicating the extent of overrunning of said one member, means acting to prevent closing of said switch until said other member overtakes said one member, and means responsive to operation of said actuating means effective for closing said switch.

8. In combination, intermittently operable actuating means, a control switch, controlling means therefor comprising a first wheel continuously driven in one direction and a second wheel normally held against rotation and rotatable in said direction a predetermined distance responsive to a single operation of said actuating means, means yieldingly resisting rotation of said first wheel effective by such yielding resistance for opening said switch and preventing closing thereof, when said first wheel overtakes said second wheel, while thereafter permitting continued rotation of said first wheel and overrunning thereby of said second wheel, and means responsive to operation of said actuating means effective for closing said switch after said second wheel overtakes said first wheel.

9. In combination, intermittently operable actuating means, a switch, a first rotatable member continuously driven in one direction, a second rotatable member confined against axial movement relative to said first member normally held against rotation but rotated a predetermined distance in said direction responsive to a single operation of said actuating means, means effective for opening the switch when said first member overtakes said second member, said first member continuing to rotate and overrunning said second member after said switch is opened, said switch opening means preventing closing of the switch while said first member is in overrun position relative to said second member, and means responsive to operation of said actuating means effective for closing said switch after said second member overtakes said first member.

10. In combination, two members rotatable in the same direction about a common axis and capable of overrunning each other, a dial attached to one of said members for rotation therewith bearing two scales, one indicating the extent of overrunning of the other said member by said one member and the other scale indicating the extent of overrunning of said one member by said other member, and means for exposing said scales in accordance with the relative rotary positions of said members and thereby indicating such relation.

11. In combination, two members rotatable in the same direction about a common axis and capable of overrunning each other, a dial attached to one of said members for rotation therewith bearing two scales, one indicating the extent of overrunning of the other said member by said one member and the other scale indicating the extent of overrunning of said one member by said other member, and means actuated by relative rotation of said other member for exposing said scales in accordance with the relative rotary positions of said members and thereby indicating such relation.

12. In combination, two members rotatable in the same direction about a common axis and capable of overrunning each other, a dial attached to one of said members for rotation therewith bearing two scales, one indicating the extent of overrunning of the other said member by said one member and the other scale indicating the extent of overrunning of said one member by said other member, a covering disc in front of said dial connected to said other member for rotation therewith, said disc having two openings aligned with the respective scales of said dial, a shutter carried by disc, and means actuated by relative rotation of said members effective for positioning the shutter to cover the opening corresponding to said other scale and uncover the opening corresponding to said one scale and vice versa in accordance with the relative rotary positions of said members.

13. In combination, intermittently operable actuating means, a switch, a first wheel continuously rotated in one direction, a second wheel rotatable in said direction normally held against rotation but rotated a predetermined distance responsive to a single operation of said actuating means, means effective for opening said switch when said first wheel overtakes said second wheel, said first wheel being capable of continued rotation and overrunning of said second wheel for a predetermined distance equal to a multiple of the distance through which said second wheel is rotated responsive to a single operation of said actuating means, subsequent to opening of said switch, means limiting overrunning of said second wheel by said first wheel, drive means including a slip connection effective for rotating said first wheel, means acting to prevent closing of the switch until said second wheel overtakes said first wheel, and means responsive to operation of said actuating means effective for closing said switch after said second wheel overtakes said first wheel.

14. In combination, intermittently operable actuating means, a switch, a first wheel continuously rotated in one direction, a second wheel rotatable in said direction normally held against rotation but rotated a predetermined distance responsive to a single operation of said actuating means, yielding means connected to said second wheel resisting relative rotation of said first wheel effective by such yielding resistance for opening said switch and preventing closing thereof, when said first wheel overtakes said second wheel, while permitting continued relative rotation of said first wheel and overrunning thereby of said second wheel, and means responsive to operation of said actuating means effective for closing said switch after said second wheel overtakes said first wheel.

15. In combination, intermittently operable actuating means, a switch, a rotatable bearing member, a first wheel having frictional driving connection to said member continuously rotated in one direction, a second wheel rotated in said direction relative to said member a predetermined distance responsive to a single operation of said actuating means, yielding means connected to said second wheel resisting relative rotation of said first wheel effective by such yielding resistance for opening said switch and preventing closing thereof, when said first wheel overtakes said second wheel, while permitting continued relative rotation of said first wheel and overrunning thereby of said second wheel, means effective for positively limiting the extent of overrunning of said second wheel by said first wheel, and means responsive to operation of said actuating means effective for closing said switch after said second wheel overtakes said first wheel.

16. In combination, intermittently operable actuating means, a switch, control means comprising two members rotatable in the same direction and confined against relative axial movement, one of said members being continuously rotated and the other of said members normally being held against rotation but rotated a predetermined distance responsive to a single operation of said actuating means, means effective for opening the switch when said first member overtakes said second member, said first member continuing to rotate and overrunning said second member after said switch is opened, said switch opening means preventing closing of the switch while said first member is in overrun position relative to said second member, and means responsive to operation of said actuating means effective for closing said switch after said second member overtakes said first member.

17. In combination, intermittently operable actuating means, a switch, control means comprising two coaxial members rotatable in the same direction and confined against relative axial movement, one of said members being continuously rotated and the other of said members normally being held against rotation but rotated a predetermined distance responsive to a single operation of said actuating means, means effective for opening the switch when said first member overtakes said second member, said first member continuing to rotate and overrunning said second member after said switch is opened, said switch opening means preventing closing of the switch while said first member is in overrun position relative to said second member, and means responsive to operation of said actuating means effective for closing said switch after said second member overtakes said first member.

18. In combination, intermittently operable actuating means, a switch, a member continuously driven in one direction, a wheel rotatable in said direction normally held against rotation but rotated a predetermined distance responsive to a single operation of said actuating means, tension spring means freely rotatable with said wheel, supplemental means effective by the tension of said spring means for opening the switch and maintaining it open when said member overtakes said wheel, said tension spring means permitting continued rotation of said member and overrunning thereby of said wheel, and means responsive to operation of said actuating means effective for closing said switch after said wheel overtakes said member.

19. In combination, intermittently operable actuating means, a switch, a member continuously driven in one direction, a wheel rotatable in said direction normally held against rotation but rotated a predetermined distance in said direction responsive to a single operation of said actuating means, said member having a pin projecting toward said wheel and said wheel having a pin projecting toward said member in advance of said first pin, a disc having a slip drive to but otherwise normally free from said member provided with a finger normally in contact with the leading face of said wheel pin and in advance and in the path of travel of the pin of said member, a spiral tension spring secured at one end to said wheel and at its other end to said disc placed under tension by rotation of said disc relative to said wheel with said member, means coacting with said member effective for opening the switch when the pin of said member contacts said finger and maintaining it open while said member overruns said wheel, and means responsive to operation of said actuating means effective for closing said switch after said wheel overtakes said member.

20. In combination, intermittently operable actuating means, a switch, a member continuously driven in one direction, a wheel rotatable in said direction normally held against rotation but rotated a predetermined distance in said direction responsive to a single operation of said actuating means, said member having a pin projecting toward said wheel and said wheel having a pin projecting toward said member in advance of said first pin, a disc provided with a finger normally in contact with the leading face of said wheel pin and in advance and in the path of travel of the pin of said member, a friction driving connection between said member and said disc, the latter normally being otherwise free from said member, a spiral tension spring secured at one end to said wheel and at its other end to said disc placed under tension by rotation of said disc relative to said wheel with said member, means coacting with said member effective for opening the switch when the pin of said member contacts said finger and maintaining it open while said member overruns said wheel, and means responsive to operation of said actuating means effective for closing said switch after said wheel overtakes said member.

ARTHUR H. WOODWARD.